(12) United States Patent
Hori et al.

(10) Patent No.: US 6,507,596 B1
(45) Date of Patent: Jan. 14, 2003

(54) GAS LASER APPARATUS

(75) Inventors: Tsukasa Hori, Hiratsuka (JP); Takanobu Ishihara, Hiratsuka (JP); Hirotoshi Inoue, Oyama (JP); Takashi Matsunaga, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/657,666

(22) Filed: Sep. 8, 2000

(51) Int. Cl.⁷ .............................................. H01S 3/097
(52) U.S. Cl. .......................................... 372/86; 372/88
(58) Field of Search ............................ 372/86, 38, 83, 372/88, 82, 69

(56) References Cited

U.S. PATENT DOCUMENTS

| | | | | |
|---|---|---|---|---|
| 5,247,531 A | * | 9/1993 | Muller-Horsche | 372/38 |
| 5,313,486 A | * | 5/1994 | Nakatani | 372/86 |
| 5,347,531 A | * | 9/1994 | Nakajatani et al. | 372/86 |
| 5,771,258 A | * | 6/1998 | Morton et al. | 372/57 |

FOREIGN PATENT DOCUMENTS

JP          0432986 A          11/1992

* cited by examiner

Primary Examiner—Leon Scott, Jr.
(74) Attorney, Agent, or Firm—Welsh & Katz, Ltd.

(57) ABSTRACT

The amount of pre-ionization by the pre-ionization electrode provided on the gas outflow side of the main discharge space, out of at least one pair of pre-ionization electrodes, is adjusted so as to attain the desired beam profile. As a result, the pre-ionization intensity of the laser gas remaining on the gas outflow side of the main discharge space is made lower than the pre-ionization intensity of the laser gas flowing into the main discharge space. In other words, the intensity of the laser light on the gas outflow side of the main discharge space is made weaker than the intensity of the laser light in the center of the main discharge space. Accordingly, the location of the maximum light intensity of the beam profile does not deviate from the center of the discharge width. Also, since the pre-ionization electrodes are provided on both the gas inflow side and the gas outflow side of the main discharge space, the pre-ionization intensity of the laser gas on the gas inflow side of the main discharge space is never stronger than the pre-ionization intensity of the laser gas present at the center of the main discharge space.

5 Claims, 7 Drawing Sheets

GAS LASER APPARATUS

BACKGROUND OF THE INVENTION

1. Field of the Invention

The present invention relates to a gas laser apparatus, and more particularly to a gas laser apparatus with which a favorable beam profile can be obtained. It also relates to a gas laser apparatus with which the flow rate of the laser gas is increased and the output energy of the laser is more stable, which makes high-repetition operation possible.

2. Description of the Related Art

With an excimer laser, whole of a rare gas is pre-ionized in a main discharge space immediately prior to discharge excitation in order to obtain a uniform glow discharge throughout the rare gas in the main discharge space.

FIG. 4 is a schematic cross section of the overall structure of a conventional excimer laser apparatus featuring pre-ionization electrodes.

As shown in FIG. 4, an excimer laser mainly comprises at least one pair of main discharge electrodes 1a and 1b which constitute a main discharge space 3 by facing each other, a laser gas G that flows from outside the main discharge space 3 into the main discharge space 3, is excited by discharge with the main discharge electrodes 1a and 1b, and flows from inside the main discharge space 3 to outside the main discharge space 3, at least one pair of pre-ionization electrodes 2a and 2b provided on the gas inflow side and the gas outflow side of the main discharge space 3 so as to sandwich the main discharge space 3 for pre-ionizing the laser gas G by directing ultraviolet light from luminescent spots Ha and Hb located around the outer periphery toward the main discharge space 3, a fan 40 for circulating the laser gas G, and a heat exchanger 41 for cooling the laser gas G flowing out of the main discharge space 3.

The pre-ionization electrode 2a on the outflow side comprises a hollow cylindrical dielectric pipe Y1, a cylindrical internal electrode F1 provided in the hollow center of the dielectric pipe Y1, and an external electrode (not shown) in contact with the outer periphery of the dielectric pipe Y1. Similarly, the pre-ionization electrode 2b on the inflow side comprises a hollow cylindrical dielectric pipe Y2 disposed at the outer-periphery, a cylindrical internal electrode F2 provided in the hollow center of the dielectric pipe Y2, and an external electrode (not shown) in contact with the outer periphery of the dielectric pipe Y2.

With the excimer laser shown in FIG. 4, the laser gas G is blown by the fan 40 in the direction L into the main discharge space 3. After this, voltage is applied between the internal electrodes F1 and F2 and the external electrodes (not shown) of the pre-ionization electrodes 2a and 2b, ultraviolet light is directed toward the main discharge space 3 from luminescent spots Ha and Hb located on the outer periphery of the dielectric pipes Y1 and Y2, and the laser gas G is pre-ionized. The pre-ionized laser gas G is excited by discharge with the main discharge electrodes 1a and 1b, and flows out of the main discharge space 3 in the direction R. As it flows in the direction R, the laser gas G is cooled by the heat exchanger 41, after which it is again blown by the fan 40 in the direction L into the main discharge space 3. Thus, with the excimer laser shown in FIG. 4, the laser gas G is circulated by the fan 40, and pulse oscillation is performed at a high-repetition frequency.

The electron density of the laser gas G is different between the situations in which the gas flows into the main discharge space 3 and in which it flows out of the main discharge space 3. This change in the electron density of the laser gas G inside the main discharge space 3 will be described through reference to FIGS. 5a, 5b, 5c, and 5d.

FIGS. 5a, 5b, 5c, and 5d are diagrams illustrating the transition in the electron density of the laser gas G within the main discharge space 3.

First, as shown in FIG. 5a, the laser gas G1 is blown by the fan 40 in the direction L and into the main discharge space 3. Voltage is then applied between the internal electrodes F1 and F2 and the external electrodes (not shown) of the pre-ionization electrodes 2a and 2b, ultraviolet light is directed toward the main discharge space 3 from luminescent spots Ha and Hb located on the outer periphery of the dielectric pipes Y1 and Y2, and the laser gas G1 is pre-ionized to an electron density of about $10^8/cm^3$.

Next, the laser gas G1 is excited by discharge with the main discharge electrodes 1a and 1b within the main discharge space 3. The laser gas G1 is ionized when subjected to discharge excitation, so the electron density rises, resulting in a laser gas G2 with an electron density of about $10^{14}/cm^3$ (FIG. 5b).

The electron density of the laser gas G2 drops after discharge excitation, resulting in a laser gas G3 with an electron density of about $10^{11}/cm^3$. The electron density of the laser gas G3 is higher than that of the laser gas G1. This laser gas G3 flows out of the main discharge space 3 in the direction R (FIG. 5c).

Next, the laser gas G1 again flows in the direction L and into the main discharge space 3. Meanwhile, the laser gas G3 is blocked from flowing out by the pre-ionization electrode 2a located on the gas outflow side of the main discharge space 3, and therefore remains for a time on the gas outflow side of the main discharge space 3. The presence of the laser gas G1 and the laser gas G3, which has a higher electron density than the laser gas G1, within the main discharge space 3 changes the distribution of the electron density of the laser gas within the main discharge space 3. Voltage is then applied between the internal electrodes F1 and F2 and the external electrodes (not shown) of the pre-ionization electrodes 2a and 2b, ultraviolet light is directed toward the main discharge space 3 from luminescent spots Ha and Hb located on the outer periphery of the dielectric pipes Y1 and Y2, and the laser gases G1 and G3 are pre-ionized (FIG. 5d).

If the electron density of the laser gas here is high, the pre-ionization intensity of the laser gas will be raised, and the intensity of the laser light will also be higher.

Therefore, as shown in FIG. 5d, if the laser gas G3, whose electron density is higher than that of the laser gas G1 flowing into the main discharge space 3, remains on the gas outflow side of the main discharge space 3, the pre-ionization intensity of the laser gas G3 will be stronger than the pre-ionization intensity of the laser gas G1, so the intensity of the laser light on the gas outflow side of the main discharge space 3 will be higher than the intensity of the laser light in the center of the main discharge space 3.

FIG. 6 is a graph of beam profiles indicating the distribution of light intensity along the discharge width of the main discharge electrodes 1a and 1b. In FIG. 6, the center Xc of the discharge width corresponds to the center of the main discharge space 3, the left side of the figure corresponds to the gas inflow side of the main discharge space 3, and the right side corresponds to the gas outflow side of the main discharge space 3.

As shown in FIG. 6, the original beam profile is the beam profile Pc, in which the center Xc of the discharge width is the maximum light intensity and which is symmetrical to the left and right with respect to the center Xc of the discharge width.

In the case of FIG. 5d, however, the intensity of the laser light on the gas outflow side of the main discharge space 3 is stronger than the intensity of the laser light in the center of the main discharge space 3, so the location of the maximum light intensity of the beam profile deviates from the center Xc of the discharge width to the location XR (the right side in the figure), as shown in FIG. 6.

In other words, the beam profile in the case of FIG. 5d is the beam profile PR, which is not symmetrical to the left and right with respect to the center Xc of the discharge width.

Therefore, a problem is that the beam profile Pc, which is symmetrical to the left and right with respect to the center Xc of the discharge width, will not be obtained if the laser gas G3, whose electron density is higher than that of the laser gas G1, remains on the gas outflow side of the main discharge space 3.

In view of this, a technique in which the laser gas is not made to remain on the gas outflow side (the downstream side for the laser gas) of the main discharge space has been disclosed in the Japanese Patent No. 2,758,730 Publication.

In the Japanese Patent No. 2,758,730, a pre-ionization electrode is provided only on the gas inflow side (the upstream side for the laser gas) of the main discharge space, and no pre-ionization electrode is provided on the gas outflow side of the main discharge space.

Therefore, with the Japanese Patent No. 2,758,730, because no pre-ionization electrode is provided on the gas outflow side of the main discharge space, the laser gas does not remain on the gas outflow side of the main discharge space.

With the Japanese Patent No. 2,758,730, however, since a pre-ionization electrode is provided only on the gas inflow side of the main discharge space, the pre-ionization intensity of the laser gas on the gas inflow side of the main discharge space is stronger than the pre-ionization intensity of the laser gas present in the center of the main discharge space. In other words, the intensity of the laser light on the gas inflow side of the main discharge space is stronger than the intensity of the laser light in the center of the main discharge space.

Consequently, as shown in FIG. 6, the location of the maximum light intensity of the beam profile deviates from the center Xc of the discharge width to the location XL on the left side of the figure, resulting in a beam profile PL which is not symmetrical to the left and right with respect to the center Xc of the discharge width.

In other words, the problem is that the beam profile Pc, which is symmetrical to the left and right with respect to the center Xc of the discharge width, is not obtained.

It is an object of the present invention to obtain a more favorable beam profile.

SUMMARY OF THE INVENTION

In view of this, in order to achieve the stated object, the first present invention is a gas laser apparatus comprising at least one pair of main discharge electrodes which constitute a main discharge space by facing each other, a laser gas that flows from outside the main discharge space into the main discharge space, is excited by discharge with the main discharge electrodes, and flows from inside the main discharge space to outside the main discharge space, and at least one pair of pre-ionization electrodes provided on the gas inflow side and the gas outflow side of the main discharge space so as to sandwich the main discharge space for pre-ionizing the laser gas, wherein the beam profile indicating the distribution of light intensity along the discharge width of the main discharge electrodes changes when the pre-ionization intensity of the laser gas changes according to the amount of pre-ionization of said at least one pair of pre-ionization electrodes, characterized in that the amount of pre-ionization of the pre-ionization electrode provided on the gas outflow side of the main discharge space out of the at least one pair of pre-ionization electrodes is adjusted so as to attain the desired beam profile.

The first invention will be described through reference to FIGS. 1a, 1b and 1c, and FIG. 6.

With the first invention, of the at least one pair of pre-ionization electrodes 2a and 2b, the amount of pre-ionization of the pre-ionization electrode 2a provided on the gas outflow side of the main discharge space 3 is adjusted by varying n1, d1 and W1 so as to attain the desired beam profile. As a result, the pre-ionization intensity of the laser gas G3 remaining on the gas outflow side of the main discharge space 3 is made lower than the pre-ionization intensity of the laser gas G1 flowing into the main discharge space 3. Accordingly, the location of the maximum light intensity of the beam profile does not deviate from the center Xc of the discharge width to the location XR on the right side in FIG. 6. Also, since the pre-ionization electrodes 2a and 2b are provided on both the gas inflow side and the gas outflow side of the main discharge space 3, the pre-ionization intensity of the laser gas G1 on the gas inflow side of the main discharge space is never stronger than the pre-ionization intensity of the laser gas G1 present at the center of the main discharge space 3, as was the case with the conventional technology. In other words, the intensity of the laser light on the gas inflow side of the main discharge space 3 is never stronger than the intensity of the laser light in the center of the main discharge space 3. Accordingly, the location of the maximum light intensity of the beam profile does not deviate from the center Xc of the discharge width to the location XL on the left side in FIG. 6. As a result, the obtained beam profile Pc is symmetrical to the left and right with respect to the center Xc of the discharge width.

Therefore, a favorable beam profile can be obtained with the first invention.

Also, in order to achieve the stated object, the second invention is a gas laser apparatus comprising at least one pair of main discharge electrodes which constitute a main discharge space by facing each other, a laser gas that flows from outside the main discharge space into the main discharge space, is excited by discharge with the main discharge electrodes and thereby changes the electron density, and flows from inside the main discharge space to outside the main discharge space, and at least one pair of pre-ionization electrodes provided on the gas inflow side and the gas outflow side of the main discharge space so as to sandwich the main discharge space for pre-ionizing the laser gas, wherein the distribution of electron density of the laser gas inside the main discharge space changes and the beam profile indicating the distribution of light intensity along the discharge width of the main discharge electrodes changes when the flow rate of the laser gas within the main discharge space changes according to the locations of said at least one pair of pre-ionization electrodes, characterized in that the location of either of the at least one pair of pre-ionization electrodes is adjusted so as to attain the desired beam profile. The second invention will be described through reference to FIGS. 2a, 2b, 2c, 2d, 2e and 2f, and FIG. 6.

With the second invention, the location of either of the at least one pair of pre-ionization electrodes 2a and 2b is adjusted so as to attain the desired beam profile. When the location of the pre-ionization electrode 2a disposed on the gas outflow side of the main discharge space 3 is adjusted, it is easier for the laser gas G3, which has a higher electron density than the laser gas G1, to flow out of the main discharge space 3, and the flow rate is increased, so this laser gas G3 does not remain on the gas outflow side of the main discharge space 3. Accordingly, the location of the maximum light intensity of the beam profile does not deviate from the center Xc of the discharge width to the location XR on the right side in FIG. 6. Meanwhile, if the location of the pre-ionization electrode 2b provided on the gas inflow side of the main discharge space 3 is adjusted, the laser gas G1 will flow more readily into the main discharge space 3, the flow rates of the laser gases G1 and G3 will increase, and the laser gas G3 will not remain on the gas outflow side of the main discharge space 3. Accordingly, the location of the maximum light intensity of the beam profile does not deviate from the center Xc of the discharge width to the location XR on the right side in FIG. 6. Also, since the pre-ionization electrodes 2a and 2b are provided on both the gas inflow side and the gas outflow side of the main discharge space 3, the pre-ionization intensity of the laser gas G1 on the gas inflow side of the main discharge space 3 is never stronger than the pre-ionization intensity of the laser gas G1 present at the center of the main discharge space 3. In other words, the intensity of the laser light on the gas inflow side of the main discharge space 3 is never stronger than the intensity of the laser light in the center of the main discharge space 3. Accordingly, the location of the maximum light intensity of the beam profile does not deviate from the center Xc of the discharge width to the location XL on the left side in FIG. 6. As a result, the obtained beam profile Pc is symmetrical to the left and right with respect to the center Xc of the discharge width.

Therefore, the same effect is obtained with the second invention as with the first invention. Also, since the flow rates of the laser gases G1 and G3 are increased, there is less dispersion in the output energy of the laser, as indicated by curve A1 in FIG. 3, so the output energy of the laser is more stable and high-repetition operation is possible.

DESCRIPTION OF THE PREFERRED EMBODIMENTS

Embodiments of the gas laser apparatus pertaining to the present invention will now be described.

Figure 1:
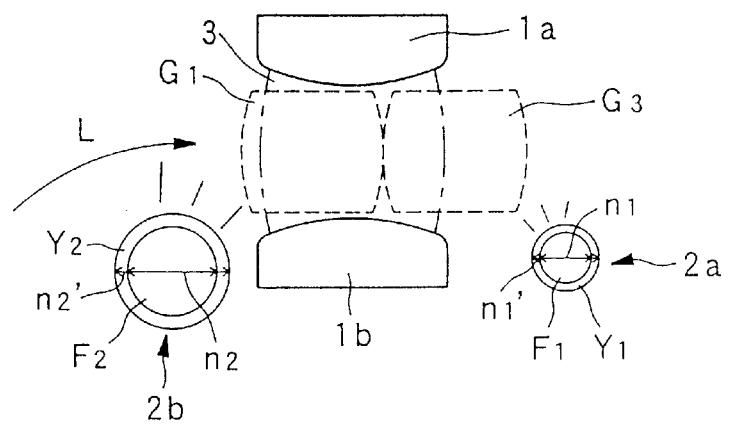
FIGS. 1a, 1b, and 1c are diagrams illustrating the first embodiment of the present invention.
Figure 1:
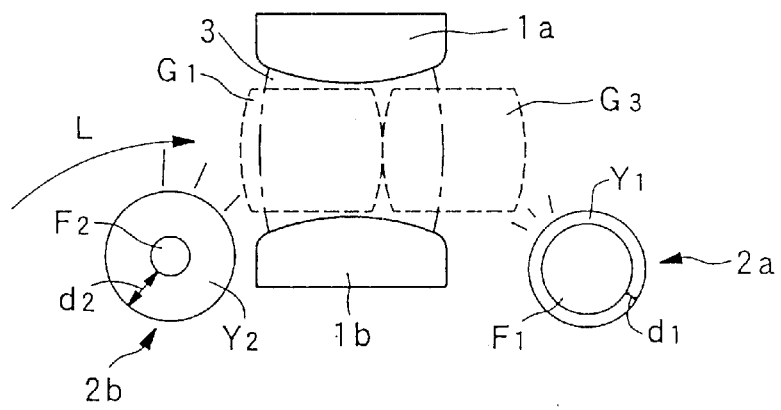
Figure 1:
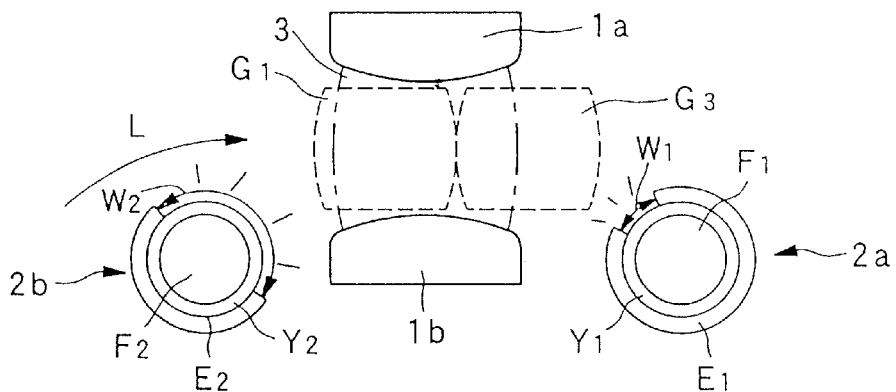

FIGS. 1a, 1b, and 1c are diagrams illustrating the first embodiment of the present invention. In FIGS. 1a, 1b, and 1c, those constituting elements that are the same as in the above-mentioned FIG. 4 and FIGS. 5a, 5b, 5c, and 5d are labeled the same, and the description of these constituting elements will be omitted as appropriate.

Figure 6:
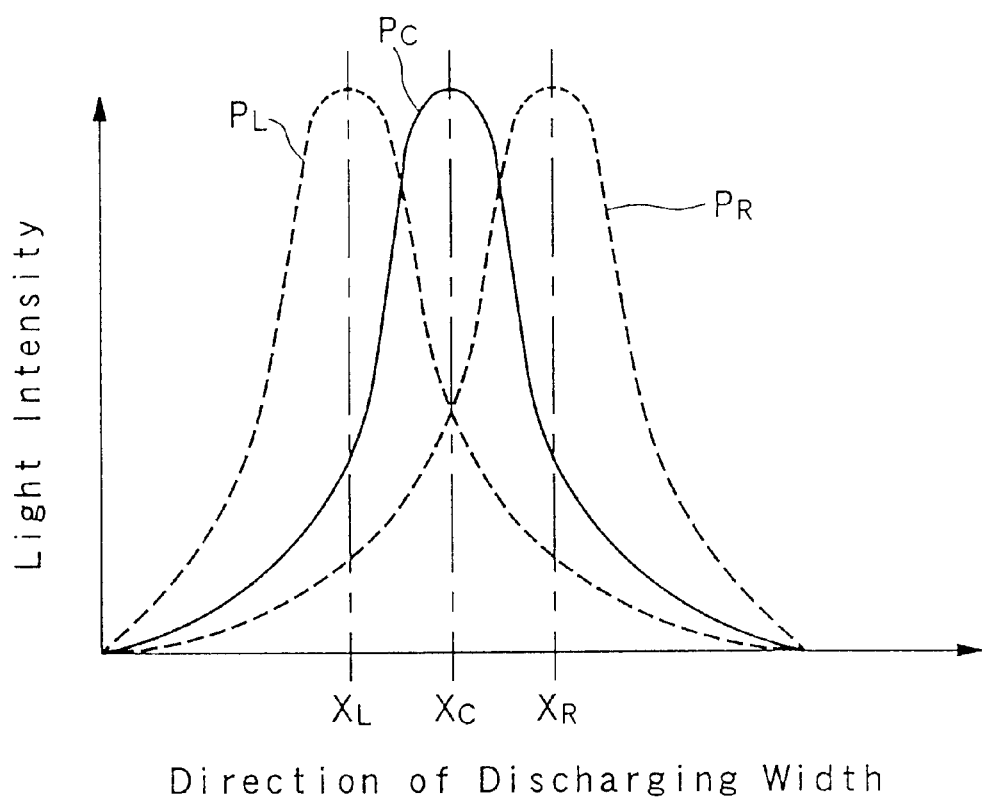
FIG. 6 is a graph of beam profiles indicating the distribution of light intensity along the discharge width of the main discharge electrodes.

In FIG. 1a, the inside diameter n1 and outside diameter n1' of the dielectric pipe Y1 of the pre-ionization electrode 2a disposed on the gas outflow side of the main discharge space 3 are smaller than the inside diameter n2 and outside diameter n2' of the dielectric pipe Y2 of the pre-ionization electrode 2b disposed on the gas inflow side of the main discharge space 3, so that the beam profile is the beam profile Pc which is symmetrical to the left and right with respect to the center Xc of the discharge width shown in FIG. 6.

In FIG. 1b, the thickness d1 of the dielectric pipe Y1 of the pre-ionization electrode 2a disposed on the gas outflow side of the main discharge space 3 is less than the thickness d2 of the dielectric pipe Y2 of the pre-ionization electrode 2b disposed on the gas inflow side of the main discharge space 3, so that the beam profile is the beam profile Pc which is symmetrical to the left and right with respect to the center Xc with respect to the discharge width shown in FIG. 6.

FIG. 1c illustrates a case in which, of the outer peripheral surface regions of the dielectric pipes Y1 and Y2 of the pre-ionization electrodes 2a and 2b, external electrodes E1 and E2 conform to and are in contact with the outer periphery of the dielectric pipes Y1 and Y2 only in the regions not facing the main discharge space 3. In FIG. 1c, the peripheral length of the external electrode E1 in the direction conforming to the outer periphery of the dielectric pipe Y1 is made longer, making the region W1 facing the main discharge space 3 out of the outer peripheral surface region of the dielectric pipe Y1 smaller than the region W2 facing the main discharge space 3 out of the outer peripheral surface region of the dielectric pipe Y2, so that the beam profile is the beam profile Pc which is symmetrical to the left and right with respect to the center Xc of the discharge width shown in FIG. 6.

The voltage applied to the pre-ionization electrode 2a disposed on the gas outflow side of the main discharge space 3 may be lower than the voltage applied to the pre-ionization electrode 2b disposed on the gas inflow side of the main discharge space 3, so that the beam profile is the beam profile Pc which will be symmetrical to the left and right with respect to the center Xc of the discharge width shown in FIG. 6.

The result of the above is that the amount of ultraviolet light emitted from the pre-ionization electrode 2a is smaller, and the pre-ionization intensity of the laser gas G3 remaining on the gas outflow side of the main discharge space 3 is stronger than the pre-ionization intensity of the laser gas G1 flowing into the main discharge space 3. Accordingly, as shown in FIG. 6, the location of the maximum light intensity of the beam profile does not deviate from the center Xc of the discharge width to the location XR on the right side in FIG. 6. Also, since the pre-ionization electrodes 2a and 2b are provided on both the gas inflow side and the gas outflow side of the main discharge space 3, the pre-ionization intensity of the laser gas G1 on the gas inflow side of the main discharge space 3 is never stronger than the pre-ionization intensity of the laser gas G1 present at the center of the main discharge space 3, as was the case with prior art. In other words, the intensity of the laser light on the gas inflow side of the main discharge space 3 is never stronger than the intensity of the laser light in the center of the main discharge space 3. Accordingly, the location of the maximum light intensity of the beam profile does not deviate from the center Xc of the discharge width to the location XL on the left side in FIG. 6. As a result, the obtained beam profile Pc is symmetrical to the left and right with respect to the center Xc of the discharge width as shown in FIG. 6.

Therefore, a favorable beam profile can be obtained with the first embodiment.

In the first embodiment discussed above, the inside diameter n1 and outside diameter n1' of the dielectric pipe Y1 of the pre-ionization electrode 2a disposed on the gas outflow side of the main discharge space 3, or the thickness d1 of the dielectric pipe Y1, or the size of the region W1 facing the main discharge space 3 out of the outer peripheral surface region of the dielectric pipe Y1, or the voltage applied to the pre-ionization electrode 2a was adjusted so that the beam profile would be the beam profile Pc which is symmetrical to the left and right with respect to the center Xc of the discharge width shown in FIG. 6, but the location of either of the at least one pair of pre-ionization electrodes 2a and 2b may instead be adjusted so that the beam profile will be the beam profile Pc which is symmetrical to the left and right with respect to the center Xc of the discharge width shown in FIG. 6.

In view of this, a second embodiment will now be described in which the location of either of the at least one pair of pre-ionization electrodes 2a and 2b is adjusted.

FIGS. 2a, 2b, 2c, 2d, 2e, and 2f are diagrams illustrating the second embodiment of the present invention. In FIGS. 2a, 2b, 2c, 2d, 2e, and 2f, those constituting elements that are the same as in FIGS. 1a, 1b, and 1c, FIG. 4 and FIGS. 5a, 5b, 5c, and 5d are labeled the same, and the description of these constituting elements will be omitted as appropriate.

Figure 2:
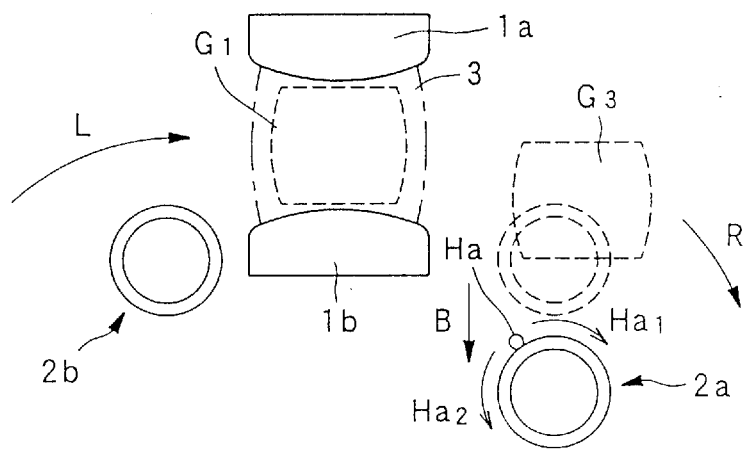
FIGS. 2a, 2b, 2c, 2d, 2e, and 2f are diagrams illustrating the second embodiment of the present invention.
Figure 2:
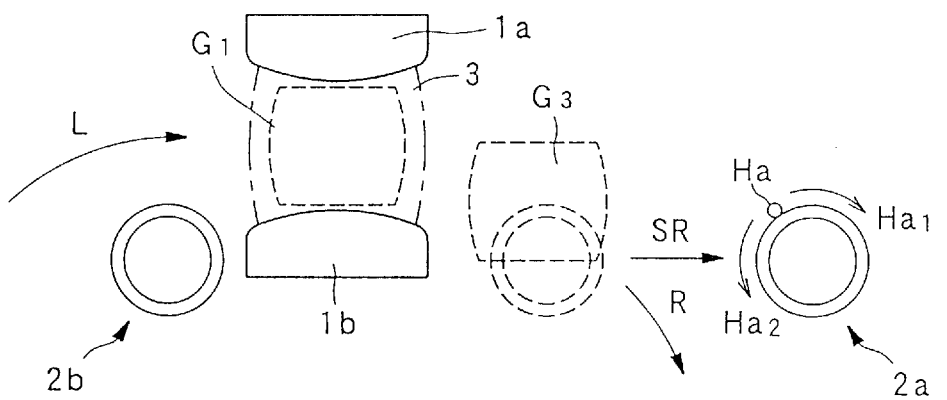
Figure 2:
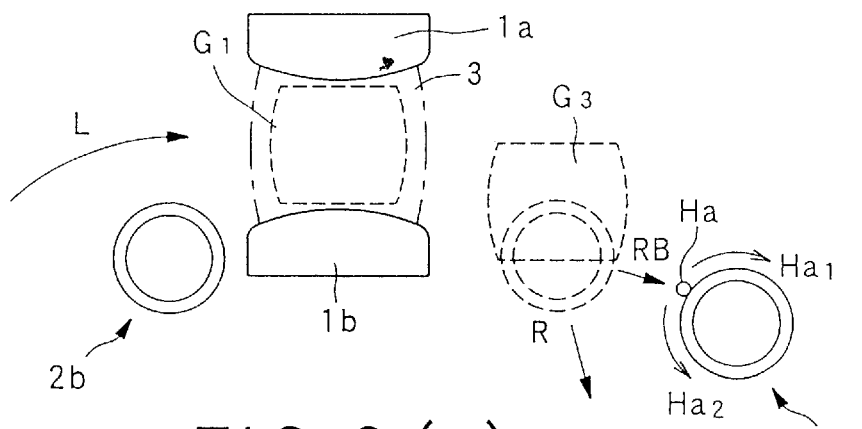
Figure 2:
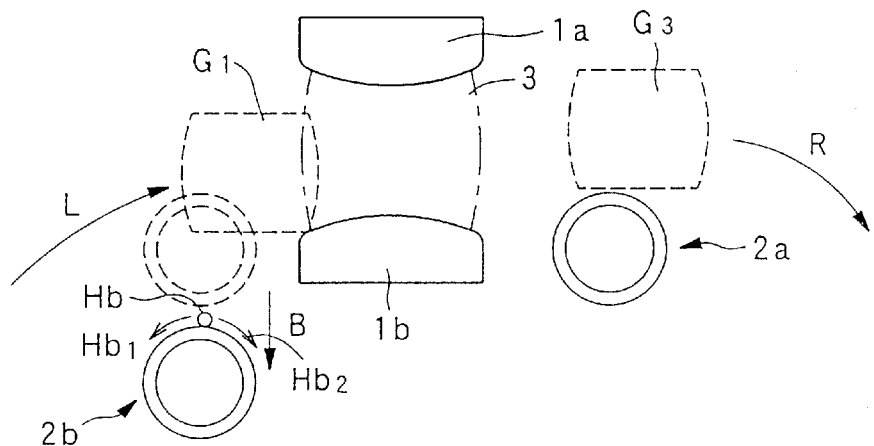
Figure 2:
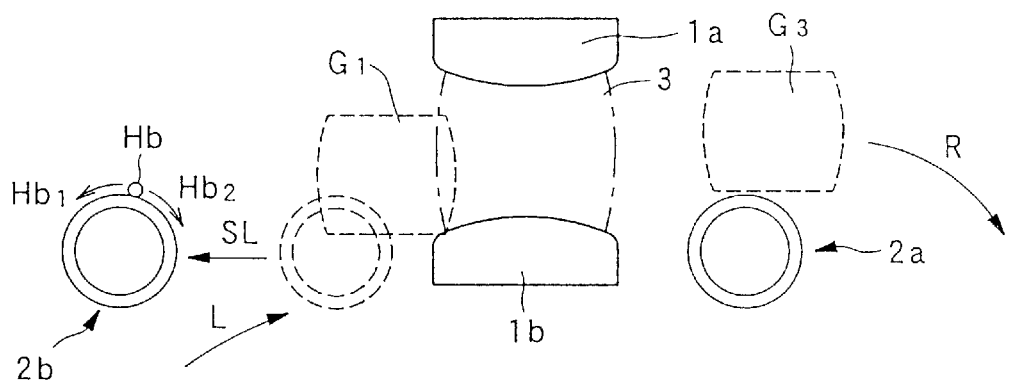
Figure 2:
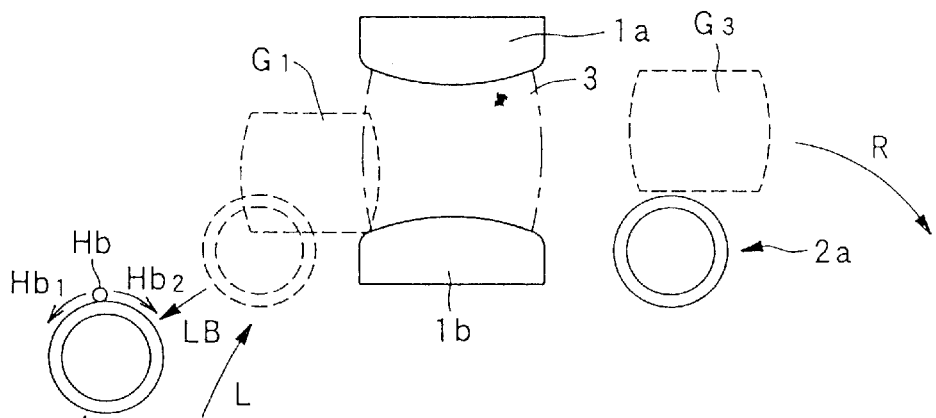

In FIG. 2a, the location of the pre-ionization electrode 2a is lowered in the direction of arrow B in the figure with respect to the location of the pre-ionization electrode 2b, so that the beam profile will be the beam profile Pc which is symmetrical to the left and right with respect to the center Xc of the discharge width shown in FIG. 6.

This prevents the outflow of the laser gas G3 from being blocked by the pre-ionization electrode 2a.

The fine adjustment for making the beam profile to be the beam profile Pc shown in FIG. 6 may be performed by shifting the luminescent spot Ha on the outer periphery of the pre-ionization electrode 2a either in the direction Ha1 or in the direction Ha2.

In FIG. 2b, the location of the pre-ionization electrode 2a is moved in the right direction of arrow SR in the figure to be further away from the main discharge space 3 than the location of the pre-ionization electrode 2b, so that the beam profile will be the beam profile Pc which is symmetrical to the left and right with respect to the center Xc of the discharge width shown in FIG. 6.

This provides a path for the laser gas G3 between the main discharge space 3 and the pre-ionization electrode 2a.

Just as in FIG. 2a, the fine adjustment for making the beam profile to be the beam profile Pc shown in FIG. 6 may be performed by shifting the luminescent spot Ha on the outer periphery of the pre-ionization electrode 2a either in the direction Ha1 or in the direction Ha2.

In FIG. 2c, the location of the pre-ionization electrode 2a is moved in the right-and-down direction of arrow RB in the figure to be further away from the main discharge space 3 than the location of the pre-ionization electrode 2b, so that the beam profile will be the beam profile Pc which is symmetrical to the left and right with respect to the center Xc of the discharge width shown in FIG. 6.

This provides a path for the laser gas G3 between the main discharge space 3 and the pre-ionization electrode 2a.

Just as in FIGS. 2a and 2b, the fine adjustment for making the beam profile to be the beam profile Pc shown in FIG. 6 may be performed by shifting the luminescent spot Ha on the outer periphery of the pre-ionization electrode 2a either in the direction Ha1 or in the direction Ha2.

With the structures in FIGS. 2a, 2b, and 2c described above, it is easier for the laser gas G3 to flow out of the main discharge space 3, and the flow rate of the laser gas G3 is increased, so the laser gas G3 will not remain on the gas outflow side of the main discharge space 3. Accordingly, the location of the maximum light intensity of the beam profile does not deviate from the center Xc of the discharge width to the location XR on the right side in FIG. 6.

In FIG. 2d, the location of the pre-ionization electrode 2b is lowered in the down direction of arrow B in the figure to be lower than the location of the pre-ionization electrode 2a, so that the beam profile will be the beam profile Pc which is symmetrical to the left and right with respect to the center Xc of the discharge width shown in FIG. 6.

This prevents the outflow of the laser gas G1 from being blocked by the pre-ionization electrode 2b.

The fine adjustment for making the beam profile to be the beam profile Pc shown in FIG. 6 may be performed by shifting the luminescent spot Hb on the outer periphery of the pre-ionization electrode 2b either in the direction Hb1 or in the direction Hb2.

In FIG. 2e, the location of the pre-ionization electrode 2b is moved in the left direction of arrow SL in the figure to be further away from the main a discharge space 3 than the location of the pre-ionization electrode 2a, so that the beam profile will be the beam profile Pc which is symmetrical to the left and right with respect to the center Xc of the discharge width shown in FIG. 6.

This provides a path for the laser gas G1 between the main discharge space 3 and the pre-ionization electrode 2b.

Just as in FIG. 2d, the fine adjustment for making the beam profile to be the beam profile Pc shown in FIG. 6 may be performed by shifting the luminescent spot Hb on the outer periphery of the pre-ionization electrode 2b either in the direction Hb1 or in the direction Hb2.

In FIG. 2f, the location of the pre-ionization electrode 2b is moved in the left-and-down direction of arrow LB in the figure to be further away from the main discharge space 3 than the location of the pre-ionization electrode 2a, so that the beam profile will be the beam profile Pc which is symmetrical to the left and right with respect to the center Xc of the discharge width shown in FIG. 6.

This provides a path for the laser gas G1 between the main discharge space 3 and the pre-ionization electrode 2b.

Just as in FIGS. 2d and 2e, the fine adjustment for making the beam profile to be the beam profile Pc shown in FIG. 6 may be performed by shifting the luminescent spot Hb on the outer periphery of the pre-ionization electrode 2b either in the direction Hb1 or in the direction Hb2.

With the structures in FIGS. 2d, 2e, and 2f described above, it is easier for the laser gas G1 to flow out of the main discharge space 3, and the flow rates of the laser gases G1 and G3 are increased, so this laser gas G3 does not remain on the gas outflow side of the main discharge space 3. Accordingly, the location of the maximum light intensity of the beam profile does not deviate from the center Xc of the discharge width to the location XR on the right side in FIG. 6.

Also, as shown in FIGS. 2a, 2b, 2c, 2d, 2e, and 2f, since the pre-ionization electrodes 2a and 2b are provided on both the gas inflow side and the gas outflow side of the main discharge space 3, the pre-ionization intensity of the laser gas G1 on the gas inflow side of the main discharge space 3 is never stronger than the pre-ionization intensity of the laser gas G1 present at the center of the main discharge space 3. In other words, the intensity of the laser light on the gas inflow side of the main discharge space 3 is never stronger than the intensity of the laser light in the center of the main discharge space 3. Accordingly, the location of the maximum light intensity of the beam profile does not deviate from the center Xc of the discharge width to the location XL on the left side in FIG. 6.

The structures shown in FIGS. 2a, 2b, 2c, 2d, 2e, and 2f give the beam profile Pc which is symmetrical to the left and right with respect to the center Xc of the discharge width.

Therefore, a favorable beam profile can be obtained with the second embodiment.

Figure 3:
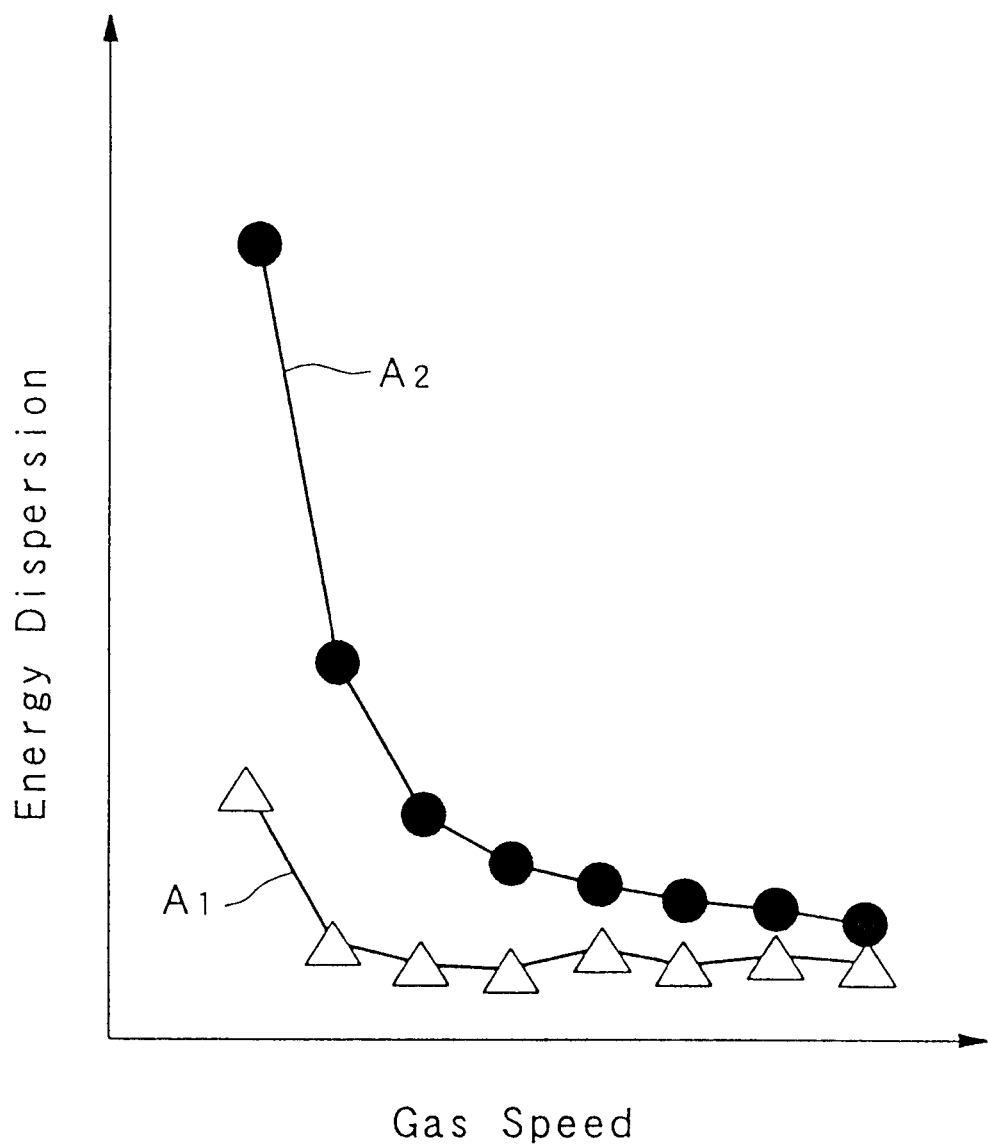
FIG. 3 is a graph of the corresponding relationship between the flow rate of the laser gas and dispersion in the output energy of the laser.
Figure 4:
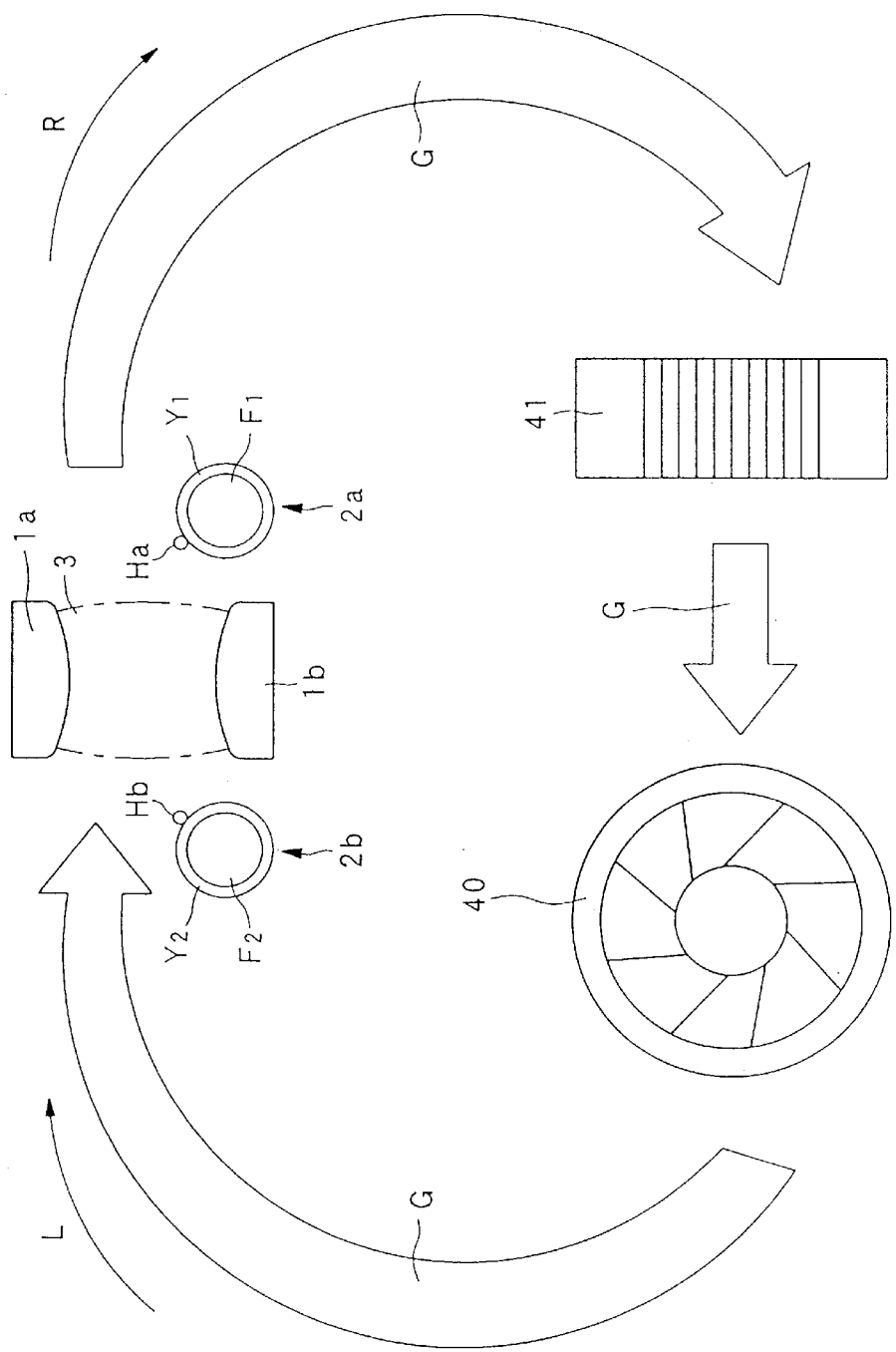
FIG. 4 is a schematic cross section of the overall structure of a conventional excimer laser apparatus.
Figure 5:
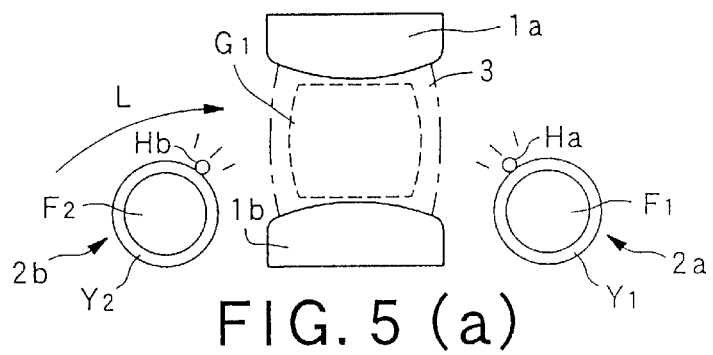
FIGS. 5a, 5b, 5c, and 5d are diagrams illustrating the transition in the electron density of the laser gas within the main discharge space.
Figure 5:
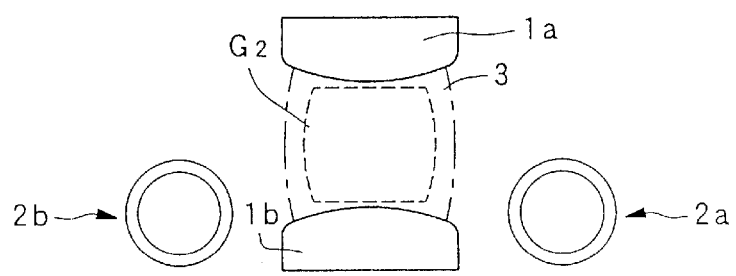
Figure 5:
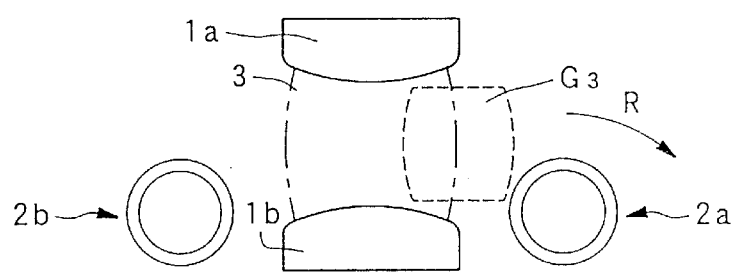
Figure 5:
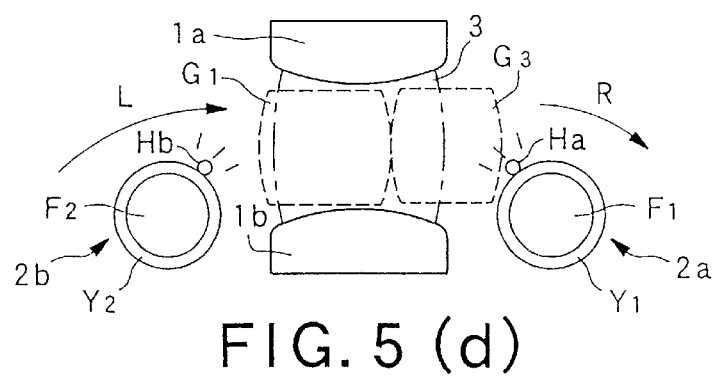

FIG. 3 is a graph of the corresponding relationship between the flow rate of the laser gas and dispersion in the output energy of the laser.

Curve A1 in FIG. 3 corresponds to when the locations of the pre-ionization electrodes 2a and 2b were adjusted as shown in FIGS. 2a, 2b, 2c, 2d, 2e, and 2f so as to increase the flow rates of the laser gases G1 and G3, while curve A2 in FIG. 3 corresponds to when the conventional technology was used, in which the locations of the pre-ionization electrodes 2a and 2b were not adjusted as shown in FIGS. 2a, 2b, 2c, 2d, 2e, and 2f.

The dispersion in laser output energy indicated by curve A1 is reduced over the entire range of laser gas flow rates compared to the dispersion in laser output energy indicated by curve A2.

Therefore, with the second embodiment, the flow rates of the laser gases G1 and G3 are increased as shown in FIGS. 2a, 2b, 2c, 2d, 2e, and 2f, so there is a reduction in laser output energy dispersion as shown by curve A1 in FIG. 3, and the output energy of the laser can be made more stable, which makes high-repetition operation possible.

What is claimed is:

1. A gas laser apparatus comprising:
   at least one pair of spaced main discharge electrodes forming a main discharge space therebetween, said pair of main discharge electrodes creating a discharge excitation by discharging a laser gas in said main discharge space;
   said gas laser apparatus having the laser gas to flow from outside the main discharge space into the main discharge space and then flow from inside the main discharge space to outside the main discharge space so that the laser gas circulates; and
   pre-ionization electrodes including at least one pair of dielectric pipes disposed asymmetrically with respect to a center of the main discharge space on a laser gas inflow side from which the laser gas flows into the main discharge space and a laser gas outflow side to which the laser gas flows from the main discharge space, for pre-ionizing the laser gas wherein the laser gas passing through the main discharge space flows at a speed so that a profile of laser beam output by the discharge excitation becomes symmetrical with respect to the center of a discharge width.

2. A gas laser apparatus that has a laser gas flow from outside a main discharge space into the main discharge space and then flow from inside the main discharge space to outside the main discharge space so that the laser gas circulates, comprising:
   at least one pair of spaced main discharge electrodes forming the main discharge space therebetween, the pair of main discharge electrodes creating a discharge excitation by discharging the laser gas in the main discharge space; and
   pre-ionization electrodes for pre-ionizing the laser gas including at least one pair of dielectric pipes, a first dielectric pipe being on a laser gas inflow side from which the laser gas flows into the main discharge space and a second dielectric pipe being on a laser gas outflow side to which the laser gas flows from the main discharge space, said first and second dielectric pipes each having an inside diameter wherein, by adjusting the inside diameters of the dielectric pipes the inside diameter of said second dielectric pipe is smaller than the inside diameter of said first dielectric pipe, and an amount of ultraviolet light emission in the laser gas inflow side is smaller than an amount of ultraviolet light emission in the laser gas inflow side whereby a profile of laser beam output by the discharge excitation is symmetrical with respect to the center of a discharge width.

3. A gas laser apparatus that has a laser gas in flow from outside a main discharge space into the main discharge space and then flow from inside the main discharge space to outside the main discharge space so that the laser gas circulates, comprising:
   at least one pair of spaced main discharge electrodes forming the main discharge space therebetween, the pair of main discharge electrodes creating a discharge excitation by discharging the laser gas in the main discharge space; and
   pre-ionization electrodes for pre-ionizing the laser gas including at least one pair of dielectric pipes, a first dielectric pipe being on a laser gas inflow side from which the laser gas flows into the main discharge space and a second dielectric pipe being on a laser gas outflow side to which the laser gas flows from the main discharge space, each of said dielectric pipes having a thickness wherein, by adjusting the thickness of the dielectric pipes so that the thickness of said second dielectric pipe is smaller than the thickness of said first dielectric pipe, and an amount of ultraviolet light emission in the laser gas outflow side is smaller than an amount of ultraviolet light emission in the laser gas inflow side whereby a profile of laser beam output by the discharge excitation is symmetrical with respect to the center of a discharge width.

4. A gas laser apparatus that has a laser gas flow from outside a main discharge space into the main discharge space and then flow from inside the main discharge space to outside the main discharge space so that the laser gas circulates, comprising;
   at least one pair of spaced main discharge electrodes forming a main discharge space therebetween, the pair of main discharge electrodes creating a discharge excitation by discharging the laser gas in the main discharge space; and
   pre-ionization electrodes for pre-ionizing the laser gas including at least one pair of dielectric pipes, said dielectric pipes each having a surface area facing the main discharge space, a first dielectric pipe being on a laser gas inflow side from which the laser gas flows into the main discharge space and a second dielectric pipe being on a laser gas outflow side to which the laser gas flows from the main discharge space wherein the surface areas of said first and second dielectric pipes are adjusted so that the surface area of said second dielectric pipe is smaller than the surface area of said first dielectric pipe, and an amount of ultraviolet light emission in the laser gas outflow side is smaller than an amount of ultraviolet light emission in the laser gas inflow side whereby a profile of laser beam output by the discharge excitation is symmetrical with respect to a center of a discharge width.

5. A gas laser apparatus that has a laser gas flow from outside a main discharge space into the main discharge space and then flow from inside the main discharge space to outside the main discharge space so that the laser gas circulates, comprising:

at least on pair of spaced main discharge electrodes forming a main discharge space therebetween, the pair of main discharge electrodes creating a discharge excitation by discharging the laser gas in the main discharge space; and pre-ionization electrodes for pre-ionizing the laser gas including at least one pair of dielectric pipes, a first dielectric pipe being on a laser gas inflow side from which the laser gas flows into the main discharge space and a second dielectric pipe being on a laser gas outflow side to which the laser gas flows from the main discharge space wherein, the voltage applied to the dielectric pipes being adjusted so that voltage applied to said second dielectric pipe is lower voltage than voltage applied to said first dielectric pipe, and an amount of ultraviolet light emission in the laser gas outflow side being smaller than an amount of ultraviolet light emission in the laser gas inflow side whereby a profile of laser beam output by discharge excitation is symmetrical with respect to die center of a discharge width.

* * * * *